July 8, 1952 W. S. PETSCHKE 2,602,630
VALVE
Filed Sept. 25, 1946
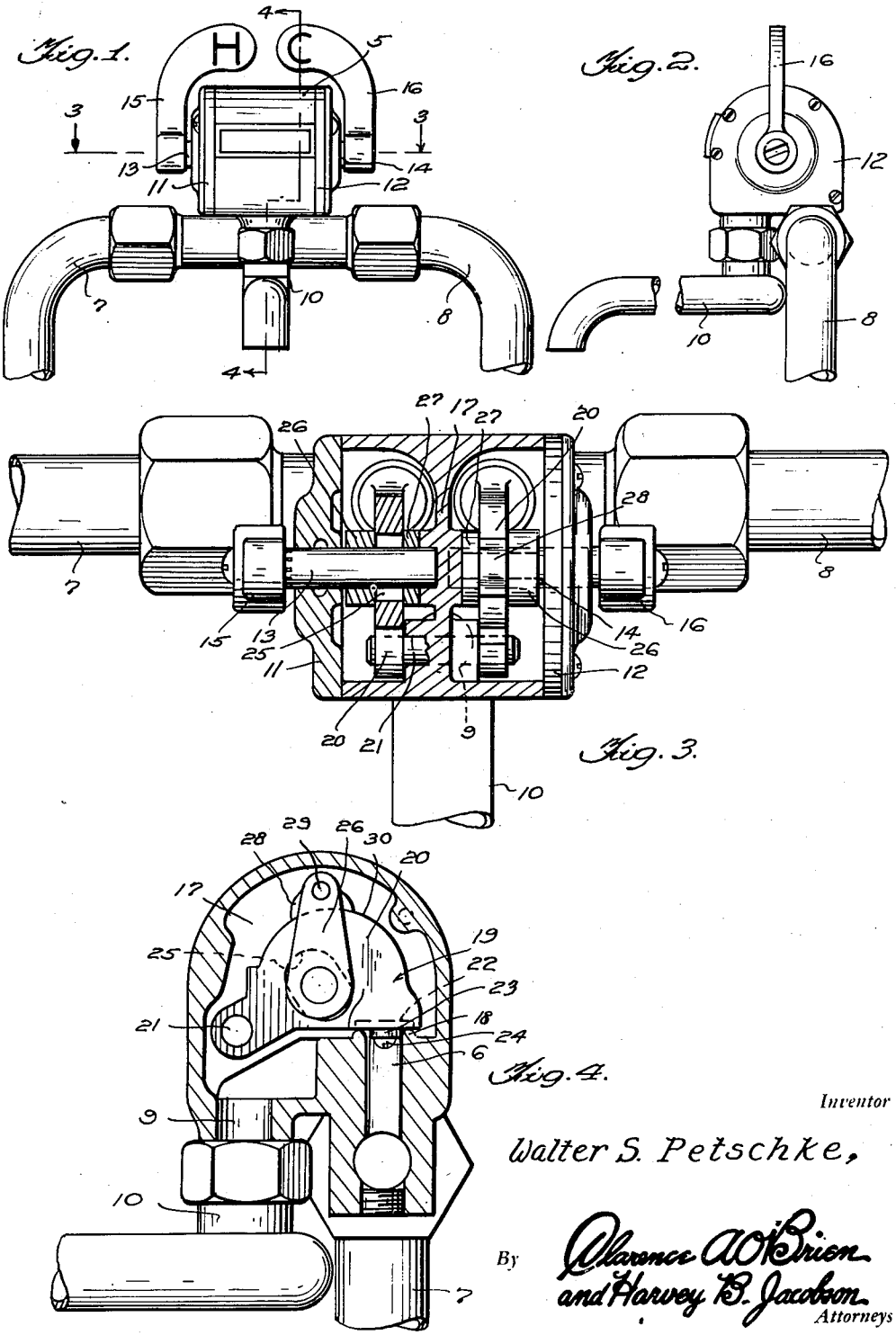
Inventor
Walter S. Petschke,
By Clarence A. O'Brien
and Harvey B. Jacobson
Attorneys Patented July 8, 1952

2,602,630

UNITED STATES PATENT OFFICE 2,602,630

VALVE

Walter S. Petschke, Mount Clemens, Mich.

Application September 25, 1946, Serial No. 699,158

7 Claims. (Cl. 251—125)

The present invention relates to new and useful improvements in valves and more particularly to a valve adapted for use as a faucet.

An important object of the present invention is to provide a valve of this character in which a cam action is employed to actuate the valve whereby resultant wear and noise is minimized.

A further object of the invention is to provide a valve carried at one edge of a pivoted cam plate for controlling the inlet port of a faucet together with a manipulating handle having a shoe attached thereto for movement along an opposite edge of the cam plate in a manner to close the valve or to release the cam plate for opening movement of the valve by pressure of the water supply.

A still further object is to provide a device of this character embodying structural elements and a design adapted for use as a faucet of neat and attractive appearance and which at the same time is efficient and reliable in operation, relatively inexpensive to manufacture and which otherwise is well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a front elevational view.

Figure 2 is a side elevational view.

Figure 3 is a transverse sectional view taken on the line 3—3 of Figure 1, and

Figure 4 is a vertical sectional view taken on a line 4—4 of Figure 1.

Referring now to the drawings in detail wherein for the purpose of illustration I have disclosed a preferred embodiment of the invention the numeral 5 designates the valve body or housing having a pair of inlet passages 6 formed therein and to which hot and cold water supply pipes 7 and 8 are respectively connected, the body or housing 5 having a single discharge port 9 to which the spout 10 of the faucet is connected.

The sides of the valve body or housing 5 are closed by end-plates 11 and 12 in which shafts 13 and 14 are respectively journalled with hot and cold water handles 15 and 16 connected to the outer ends thereof. The inner ends of the shafts 13 and 14 are journalled in a web 17 formed in the central portion of the housing 5.

The inner end of the inlet port 6 is formed with an integrally cast valve seat 18 with which a valve designated generally at 19 cooperates, the valve comprising a cam plate 20 pivoted at one end on a pin 21 carried by the web 17. One edge of the cam plate 20 is formed with an annular recess 22 in which a washer 23 is secured by a screw 24 for engaging the seat 18.

The central portion of the cam plate 20 is formed with an oval shaped opening 25 through which the shaft projects for free movement of the cam plate thereon.

A pair of arms or links 26 and 27 are positioned at opposite sides of the cam plate with one end of the links secured to the shaft and the end of the links having a shoe 28 positioned therebetween and pivoted to the links by a pin 29, the shoe being arranged to ride on the curved cam edge 30 of the cam plate 20.

Each of the shafts 13 and 14 is provided with one of the valves 19 for controlling the supply of water admitted into the housing 5 through the respective hot and cold water inlets 6, the water being mixed in the housing and discharged therefrom through the port 9.

An operation of the handles 15 or 16 in one direction will move the shoe 28 connected thereto toward the pivoted end of the cam plate 20 whereby to release the valve from the valve seat and admit water into the housing whereas a movement of the handle in an opposite direction will cause the shoe 28 to travel along the curved edge 30 of the cam plate toward the free end of the valve plate to thus close the valve.

While I have illustrated the invention arranged for use as a water faucet having hot and cold water valves and handles it will be understood that a single valve mechanism and handle may be provided for controlling a single supply pipe.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

I claim:

1. A valve of the class described comprising a housing having inlet and outlet ports therein, a pivoted valve arranged for closing the inlet port, said valve including an arcuate plate at the back of the valve, a manually operated swingable arm in the housing and positioned parallel to the plate at one side of the latter, and means at the free end of the arm riding on the rear edge of the arcuate plate for closing the valve.

2. A valve of the class described comprising a housing having inlet and outlet ports therein, a pivoted valve plate in the housing and having a front edge swingable edgewise toward and away from the inlet port, a valve member carried at the front edge of the plate for closing the inlet port, and operating means engaging the rear edge of the plate for moving the valve member into its closed position.

3. A valve of the class described comprising a housing having inlet and outlet ports therein, a pivoted valve plate in the housing and having a front edge swingable edgewise toward and away from the inlet port, a valve member carried at the front edge of the plate for closing the inlet port, a shoe arranged to travel along the rear edge of the plate for moving the valve member into its closed position, and operating means for the shoe.

4. A valve of the class described comprising a housing having inlet and outlet ports therein, a pivoted valve plate in the housing and having a front edge swingable edgewise toward and away from the inlet port, a valve member carried at the front edge of the plate for closing the inlet port, a shoe arranged to travel along the rear edge of the plate for moving the valve member into its closed position, and a handle for operating the shoe.

5. A valve mechanism comprising a body having inlet and outlet ports, a valve seat for one of the ports, a flat cam pivoted in the body and swingable edgewise toward and away from said one port, an annular recess in the front edge of the cam, a washer positioned in the recess for engaging the seat, the rear edge of the cam being arcuate, a shoe arranged to ride against the arcuate rear edge of the cam to close the washer against the seat, and manipulating means for the shoe.

6. A valve mechanism comprising a body having inlet and outlet ports, a valve seat for one of the ports, a valve plate pivoted in the body and having a front edge swingable toward and away from said one port, a valve carried at the front edge of the valve plate for engaging the seat, said plate having a rear arcuate edge, a handle projecting outwardly of the body, a link fixed at one end to the inner end of the handle, and a shoe rockably connected to the free end of the link and positioned to ride along the arcuate rear edge of the valve plate to close the valve.

7. A valve mechanism comprising a body having inlet and outlet ports, a valve seat for one of the ports, a valve plate pivoted in the body and having a front edge swingable toward and away from said one port, a valve carried at the front edge of the valve plate for engaging the seat, said plate having a rear arcuate edge, a shaft journalled in the body and having a handle at its outer end, a link fixed at one end to the inner end of the shaft, and a shoe rockably connected to the free end of the link and positioned to ride along the arcuate rear edge of the valve plate to close the valve.

WALTER S. PETSCHKE.

REFERENCES CITED

The following references are of record in the file of this patent:

UNITED STATES PATENTS

| Number | Name | Date |
|---|---|---|
| 291,668 | Barker | Jan. 8, 1884 |
| 291,770 | Pratt | Jan. 8, 1884 |
| 350,219 | Trott | Oct. 5, 1886 |
| 593,567 | Crane | Nov. 16, 1897 |
| 971,802 | Tanner | Oct. 4, 1910 |
| 1,198,128 | Hills | Sept. 12, 1916 |
| 1,980,096 | Rowley | Nov. 6, 1934 |

FOREIGN PATENTS

| Number | Country | Date |
|---|---|---|
| 4,090 | Great Britain | of 1897 |